United States Patent
Meng et al.

(10) Patent No.: US 10,462,829 B2
(45) Date of Patent: Oct. 29, 2019

(54) METHOD AND APPARATUS FOR ACCESSING WIRELESS ACCESS POINT

(71) Applicant: Beijing Xiaomi Mobile Software Co., Ltd., Beijing (CN)

(72) Inventors: Deguo Meng, Beijing (CN); Yi Ding, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 185 days.

(21) Appl. No.: 15/366,185

(22) Filed: Dec. 1, 2016

(65) Prior Publication Data

US 2017/0303320 A1  Oct. 19, 2017

(30) Foreign Application Priority Data

Apr. 14, 2016 (CN) .......................... 2016 1 0230550

(51) Int. Cl.
*H04W 76/11*   (2018.01)
*H04H 20/16*   (2008.01)
(Continued)

(52) U.S. Cl.
CPC ............ *H04W 76/11* (2018.02); *H04H 20/16* (2013.01); *H04L 61/6081* (2013.01);
(Continued)

(58) Field of Classification Search
CPC ..... H04W 76/11; H04W 48/16; H04W 12/06; H04W 12/08; H04W 8/005; H04W 84/12;
(Continued)

(56) References Cited

U.S. PATENT DOCUMENTS

2010/0008285 A1\* 1/2010 Kuroda ............. H04W 36/0055
370/315
2011/0182204 A1\* 7/2011 Goto ..................... H04W 28/18
370/252
(Continued)

FOREIGN PATENT DOCUMENTS

CN   103825788 A   5/2014
CN   103916982 A   7/2014
(Continued)

OTHER PUBLICATIONS

Decision to Grant a Patent for an Invention from Patent Office of the Russian Federation for Russian Application No. 2016139026/08, dated Nov. 29, 2017 and English translation thereof, 14 pages.
(Continued)

*Primary Examiner* — Noel R Beharry
*Assistant Examiner* — Sharmin Chowdhury
(74) *Attorney, Agent, or Firm* — Finnegan, Henderson, Farabow, Garrett & Dunner LLP

(57) ABSTRACT

A method for accessing a wireless access point is provided. The method includes: receiving access information of the wireless access point broadcasted by a preset device, the access information including a Basic Service Set Identifier (BSSID) and an access password of the wireless access point, and the preset device having successfully accessed the wireless access point; unicasting device discovery information according to the BSSID, the device discovery information including the BSSID; receiving feedback information sent by the wireless access point, the feedback information including a Service Set Identifier (SSID) of the wireless access point; and accessing the wireless access point according to the SSID in the feedback information and the access password.

10 Claims, 10 Drawing Sheets

(51) Int. Cl.
*H04L 29/12* (2006.01)
*H04W 8/00* (2009.01)
*H04W 12/06* (2009.01)
*H04W 12/08* (2009.01)
*H04W 48/16* (2009.01)
*H04W 84/12* (2009.01)
*H04W 88/08* (2009.01)
*H04W 8/14* (2009.01)
*H04W 12/04* (2009.01)
*H04W 48/20* (2009.01)

(52) U.S. Cl.
CPC .......... *H04W 8/005* (2013.01); *H04W 12/06* (2013.01); *H04W 12/08* (2013.01); *H04W 48/16* (2013.01); *H04W 8/14* (2013.01); *H04W 12/04* (2013.01); *H04W 48/20* (2013.01); *H04W 84/12* (2013.01); *H04W 88/08* (2013.01)

(58) Field of Classification Search
CPC ....... H04W 12/04; H04W 8/14; H04W 88/08; H04W 48/20; H04L 61/6081; H04H 20/16
See application file for complete search history.

(56) References Cited

U.S. PATENT DOCUMENTS

| | | | |
|---|---|---|---|
| 2013/0201980 A1* | 8/2013 | Rahul | H04W 88/08 370/338 |
| 2013/0231151 A1 | 9/2013 | Kneckt et al. | |
| 2013/0237148 A1 | 9/2013 | McCann et al. | |
| 2014/0185599 A1 | 7/2014 | Vatanapanpilas et al. | |
| 2015/0139025 A1 | 5/2015 | Lee et al. | |
| 2015/0163398 A1* | 6/2015 | Brockway, III | H04N 5/23206 348/61 |
| 2015/0223154 A1 | 8/2015 | Jeong et al. | |
| 2015/0230162 A1* | 8/2015 | Park | H04W 48/16 370/338 |
| 2016/0255661 A1 | 9/2016 | Siraj et al. | |
| 2018/0139202 A1* | 5/2018 | Sethi | H04B 10/116 |

FOREIGN PATENT DOCUMENTS

| | | |
|---|---|---|
| CN | 104094641 A | 10/2014 |
| CN | 104283642 A | 1/2015 |
| CN | 104333886 A | 2/2015 |
| CN | 104618893 A | 5/2015 |
| CN | 104660726 A | 5/2015 |
| CN | 104703176 A | 6/2015 |
| CN | 104703252 A | 6/2015 |
| CN | 104837154 A | 8/2015 |
| CN | 104869612 A | 8/2015 |
| CN | 105049416 A | 11/2015 |
| CN | 105228147 A | 1/2016 |
| CN | 105491600 A | 4/2016 |
| EP | 2985975 A1 | 2/2016 |
| JP | 2005136591 A | 5/2005 |
| JP | 2014072767 A | 4/2014 |
| JP | 2015513242 A | 4/2015 |
| RU | 2510141 C2 | 3/2014 |
| WO | WO 2016/023367 A1 | 2/2016 |

OTHER PUBLICATIONS

English version of Search Report from Patent Office of the Russian Federation for International Application No. PCT/CN2016/092208, dated Nov. 29, 2017, 2 pages.

Extended European Search Report from European Patent Office for European Application No. 16199606.1, dated Jun. 8, 2017, 17 pages.

English version of International Search Report for International Application No. PCT/CN2016/092208, dated Jan. 3, 2017.

International Search Report for International Application No. PCT/CN2016/092208, dated Jan. 3, 2017, 5 pages.

* cited by examiner

METHOD AND APPARATUS FOR ACCESSING WIRELESS ACCESS POINT

CROSS-REFERENCE TO RELATED APPLICATION

This application is based upon and claims priority to Chinese Patent Application No. 201610230550.1, filed Apr. 14, 2016, the entire contents of which are incorporated herein by reference.

TECHNICAL FIELD

The present disclosure generally relates to the field of communication, and more particularly, to a method and apparatus for accessing a wireless access point.

BACKGROUND

Smart devices are often equipped with a Wireless-Fidelity (Wi-Fi) function. However, for the smart devices that have no keyboard or display screen to display a Service Set Identifier (SSID) of a wireless router, in general, such smart devices may be unable to directly access the wireless router.

One accessing method involves assistance from a mobile phone. For example, after accessing a wireless router, a mobile phone may unicast an SSID and an access password of the wireless router, and then a smart device may access the wireless router according to the SSID and the access password unicasted by the mobile phone.

Since the SSID has no standard coding format, a coding format of the SSID of the wireless router may be different from a coding format of an SSID used by the mobile phone. The mobile phone may automatically convert the coding format of the SSID of the wireless router into the coding format of the SSID used by the mobile phone, and unicast the converted SSID to the smart device. As a result, the wireless router may not recognize the converted SSID sent by the smart device and decline the smart device's access to the wireless router.

SUMMARY

According to a first aspect of the present disclosure, there is provided a method for accessing a wireless access point, comprising: receiving access information of the wireless access point broadcasted by a preset device, the access information including a Basic Service Set Identifier (BSSID) and an access password of the wireless access point, and the preset device having successfully accessed the wireless access point; unicasting device discovery information according to the BSSID, the device discovery information including the BSSID; receiving feedback information sent by the wireless access point, the feedback information including a Service Set Identifier (SSID) of the wireless access point; and accessing the wireless access point according to the SSID in the feedback information and the access password.

According to a second aspect of the present disclosure, there is provided a method for accessing a wireless access point, comprising: accessing a wireless access point; and broadcasting access information of the wireless access point, the access information including a Basic Service Set Identifier (BSSID) and an access password of the wireless access point, and the BSSID and the access password being configured for instructing a device to access the wireless access point.

According to a third aspect of the present disclosure, there is provided an apparatus for accessing a wireless access point, comprising: a processor; and a memory for storing instructions executable by the processor. The processor is configured to: receive access information of the wireless access point broadcasted by a preset device, the access information including a Basic Service Set Identifier (BSSID) and an access password of the wireless access point, and the preset device having successfully accessed the wireless access point; unicast device discovery information according to the BSSID, the device discovery information including the BSSID; receive feedback information sent by the wireless access point, the feedback information including a Service Set Identifier (SSID) of the wireless access point; and access the wireless access point according to the SSID in the feedback information and the access password.

According to a fourth aspect of the present disclosure, there is provided an apparatus for accessing a wireless access point, comprising: a processor; and a memory for storing instructions executable by the processor. The processor is configured to: access a wireless access point; and broadcast access information of the wireless access point, the access information including a Basic Service Set Identifier (BSSID) and an access password of the wireless access point, and the BSSID and the access password being configured for instructing a device to access the wireless access point.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
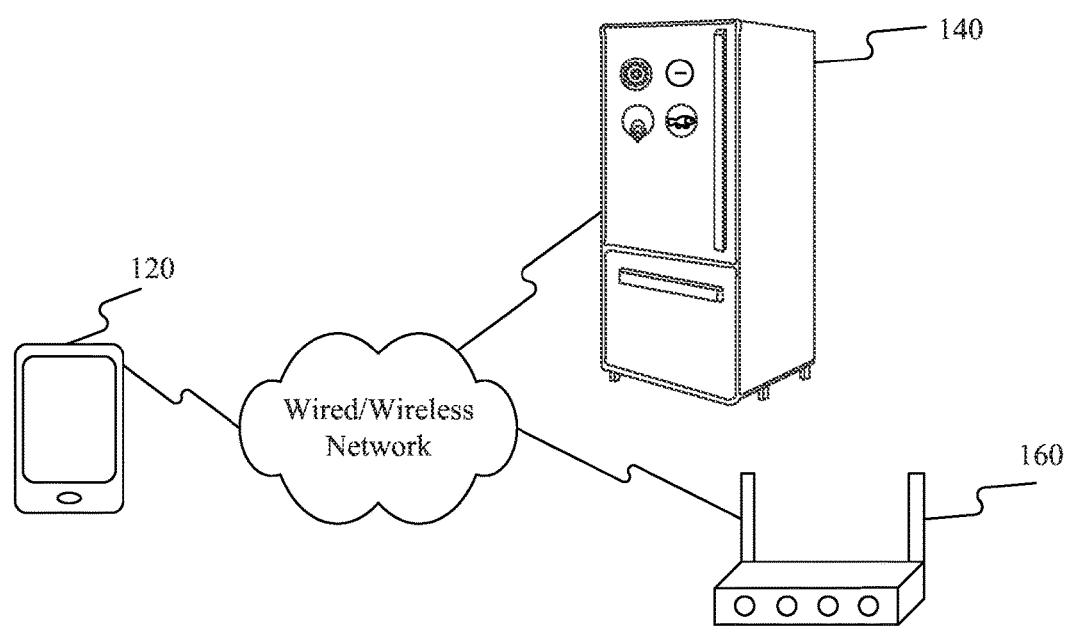
FIG. 1 is a schematic diagram showing a system environment, according to an exemplary embodiment.

FIG. 1 is a schematic diagram showing a system environment 100, according to an exemplary embodiment. Referring to FIG. 1, the system environment 100 may include a preset device 120, a smart device 140 and a wireless access device 160.

The preset device 120 may be a mobile phone, a tablet computer, an e-book reader, a laptop computer, and the like. The preset device 120 may be connected with the wireless access device 160 via, e.g., Wi-Fi, and the preset device 120 may be connected with the smart device 140 via, e.g., Bluetooth, Near Field Communication (NFC), or Zigzag Flying of Bees (Zigbee).

The smart device 140 may be a smart air conditioner, a smart TV, a smart refrigerator, an air purifier, a smart electric cooker, a smart heater, and the like. The smart device 140 may be connected with the wireless access device 160 via, e.g., Bluetooth, NFC, Zigbee or Wi-Fi. Although FIG. 1 shows one smart device 140, the system environment 100 may include a plurality of smart devices 140.

The wireless access device 160 may be a wireless router.

Figure 2:
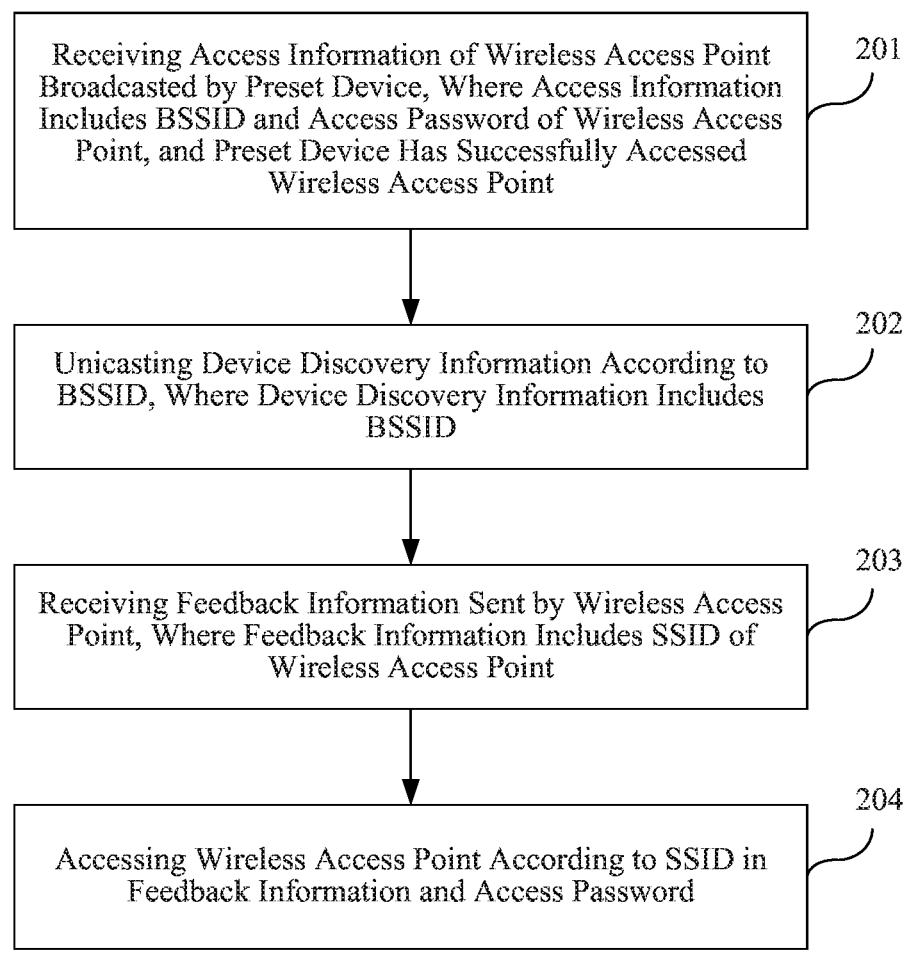
FIG. 2 is a flowchart of a method for accessing a wireless access point, according to an exemplary embodiment.

FIG. 2 is a flowchart of a method 200 for accessing a wireless access point, according to an exemplary embodiment. For example, the method 200 may be performed by the smart device shown in FIG. 1. Referring to FIG. 2, the method 200 may include the following steps.

In step 201, the smart device receives access information of the wireless access point broadcasted by a preset device, where the access information includes a Basic Service Set Identifier (BSSID) and an access password of the wireless access point, and the preset device has successfully accessed the wireless access point. For example, the BSSID may be set as a Media Access Control (MAC) address associated with the wireless access point.

In step 202, the smart device unicasts device discovery information according to the BSSID, where the device discovery information includes the BSSID. In some embodiments, the device discovery information includes a probe request, and the probe request includes the BSSID.

In step 203, the smart device receives feedback information sent by the wireless access point, where the feedback information includes a Service Set Identifier (SSID) of the wireless access point. In some embodiments, the feedback information sent by the wireless access point includes a probe response. For example, the SSID may be set as a name of a local area network (LAN) provided by the wireless access point.

In step 204, the smart device accesses the wireless access point according to the SSID in the feedback information and the access password.

In some embodiments, the access information further includes an SSID of the wireless access point broadcasted by the preset device, and the smart device may detect whether the SSID in the access information includes a preset character before unicasting the device discovery information. The preset character may be a character having a plurality of coding formats. If the preset character is included in the SSID, the smart device may perform the step of unicasting the device discovery information according to the BSSID.

In the method 200, by receiving the feedback information including an SSID of the wireless access point, the smart device may access the wireless access point according to the SSID in the feedback information and the access password previously received from the preset device, thereby establishing a connection to the wireless router.

Figure 3:
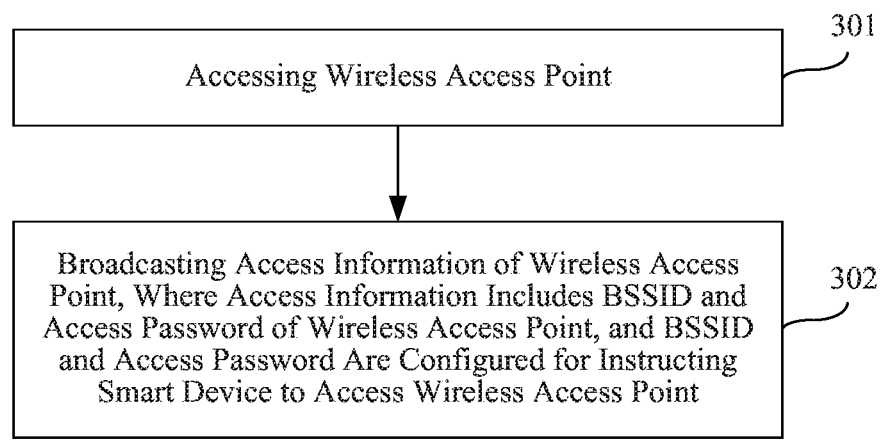
FIG. 3 is a flowchart of a method for accessing a wireless access point, according to another exemplary embodiment.

FIG. 3 is a flowchart of a method 300 for accessing a wireless access point, according to another exemplary embodiment. For example, the method 300 may be performed by the preset device shown in FIG. 1. Referring to FIG. 3, the method 300 may include the following steps.

In step 301, the preset device accesses a wireless access point.

In step 302, the preset device broadcasts access information of the wireless access point, where the access information includes a BSSID and an access password of the wireless access point. The BSSID and the access password are configured for instructing a smart device to access the wireless access point.

In some embodiments, the method 300 further includes detecting whether an SSID of the wireless access point includes a preset character before broadcasting the access information of the wireless access point.

The preset character may be a character having a plurality of coding formats. If the preset character is included in the SSID of the wireless access point, the preset device may perform the step of broadcasting the access information of the wireless access point.

In the method 300, the smart device may access the wireless access point according to the received BSSID and the access password, thereby establishing a connection to the wireless router.

Figure 4A:
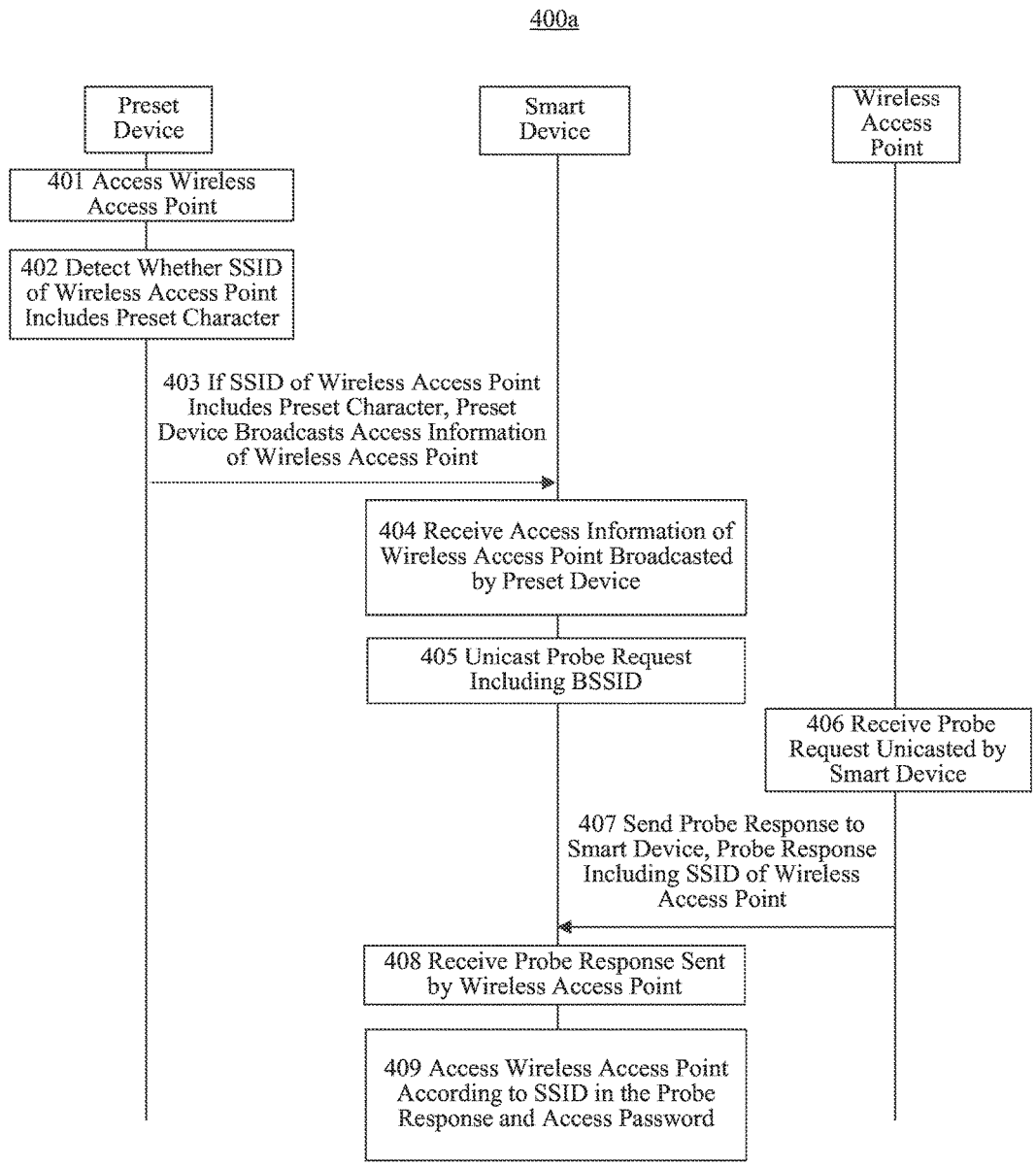
FIG. 4A is a flow diagram of a method for accessing a wireless access point, according to another exemplary embodiment.

FIG. 4A is a flow diagram of a method 400a for accessing a wireless access point, according to another exemplary embodiment. For example, the method 400a may be used in the system environment 100 shown in FIG. 1. Referring to FIG. 4A, the method 400a may include the following steps.

In step 401, a preset device accesses a wireless access point.

In the following description, a wireless router is described as an example of the wireless access point, and a mobile phone is described as an example of the preset device.

For example, the mobile phone may search for SSIDs of respective nearby wireless routers, display an interface showing the identified respective SSIDs, receive a selection signal of selecting a certain SSID by a user via the interface, receive an access password of the SSID inputted by the user, and access the wireless router according to the SSID and the received access password.

In step 402, the preset device detects whether the SSID of the wireless access point includes a preset character.

In some embodiments, the preset character is a character having a plurality of coding formats. For example, a Chinese character generally has two coding formats of UTF-8 and GBK, and the mobile phone may detect whether the stored SSID of the wireless router includes the Chinese character.

In step 403, if the SSID of the wireless access point includes the preset character, the preset device broadcasts the access information of the wireless access point.

If the SSID of the wireless router includes the preset character, it indicates that the coding format of the SSID in the mobile phone may be different from the coding format of the SSID of the wireless router. The mobile phone may then broadcast the access information including the BSSID of the wireless router and the access password. In some implementations, the access information may further include an SSID of the wireless router, which is not limited by the present embodiment.

If no preset character is included in the SSID of the wireless router, it indicates that the coding format of the SSID in the mobile phone is the same as the coding format of the SSID of the wireless router. The mobile phone may broadcast the SSID of the wireless router and the access password. After the mobile phone broadcasts the existing SSID and the access password, the smart device may successfully be connected to the wireless router according to the SSID and the access password.

In some embodiments, after receiving a trigger signal from a user, the mobile phone may broadcast the access information. For example, when the user desires to have a refrigerator of his house access the wireless router, the user may provide a user input to trigger the mobile phone to broadcast the access information.

In step 404, the smart device receives the access information of the wireless access point broadcasted by the preset device.

In step 405, the smart device unicasts a probe request including the BSSID.

In step 406, the wireless access point receives the probe request unicasted by the smart device.

After the smart device unicasts the probe request, devices nearby the smart device may receive the probe request, such as the wireless router corresponding to the BSSID.

In step 407, the wireless access point sends a probe response to the smart device, wherein the probe response includes an SSID of the wireless access point.

After receiving the probe request, the respective devices nearby the smart device may read an identification included in the probe request, and when the identification identifies the device itself, such as the wireless router, this device may send the probe response to the smart device. The probe response may include an SSID of the wireless router, where the SSID in the probe response may be recognized by the wireless router and have the same coding format as the SSID stored in the wireless router.

In step 408, the smart device receives the probe response sent by the wireless access point.

In step 409, the smart device accesses the wireless access point according to the SSID in the probe response and the access password.

After receiving the probe response, the smart device may read the SSID included in the probe response, and access the wireless router according to the SSID and the access password in the access information received previously.

For example, when the user needs to connect the air conditioner of his house to the wireless router, he may first connect the mobile phone to the wireless router, and after successfully accessing the wireless router, he may trigger the mobile phone to broadcast the BSSID and the wireless password of the wireless router. After receiving the information broadcasted by the mobile phone, the air conditioner in the house unicasts device discovery information according to the received BSSID. When the wireless router detects that the BSSID unicasted by the air conditioner is the BSSID of the wireless router itself, the wireless router sends feedback information to the air conditioner, the feedback information including an SSID of the wireless router. Then the air conditioner may successfully connect to the wireless router according to the SSID in the feedback information and the wireless password broadcasted by the mobile phone previously.

Figure 4B:
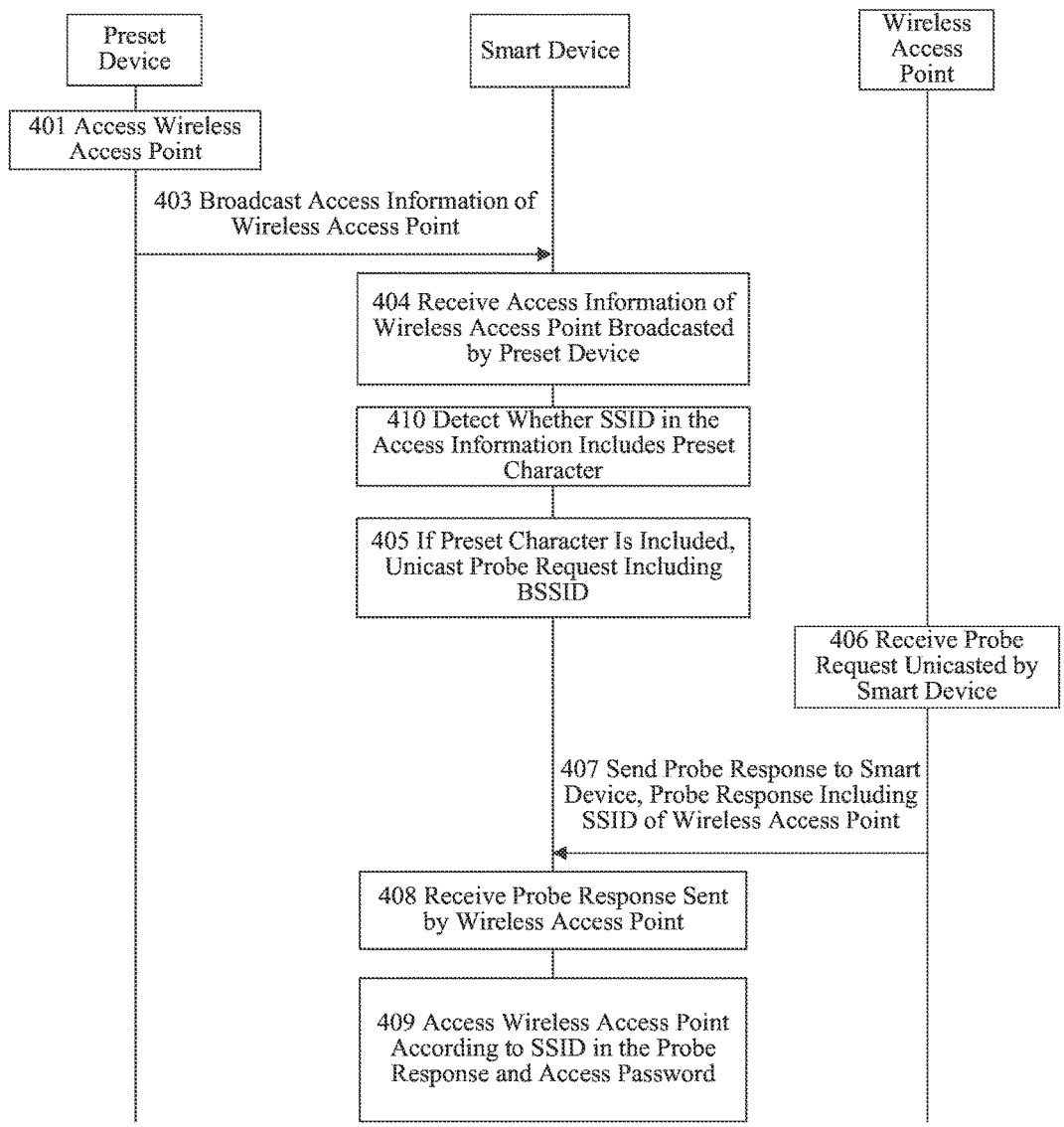
FIG. 4B is a flow diagram of another method for accessing a wireless access point, according to another exemplary embodiment.

FIG. 4B is a flow diagram of a method 400b for accessing a wireless access point, according to another exemplary embodiment. As shown in FIG. 4B, the step 402 in FIG. 4A may be omitted, and the preset device may perform the step 403 directly after step 401, to broadcast the access information of the wireless access point.

Referring to FIG. 4B, when the access information broadcasted by the preset device includes the SSID, the BSSID, and the access password, the method 400b may further include the step 410 before the step 405.

In step 410, the smart device detects whether the SSID in the access information includes a preset character. The preset character may be a character having a plurality of coding formats. This step is similar to the step 402 described in connection with FIG. 4A.

Correspondingly, in the step 405, if the preset character is included in the SSID in the access information, the smart device unicasts a probe request including the BSSID.

If the preset character is included in the SSID in the access information, it indicates that the coding format of the received SSID may be different from the coding format of the SSID of the wireless router. The smart device may not access the wireless router according to the received SSID, and the smart device may unicast a probe request including the BSSID.

If the preset character is not included in the SSID in the access information, it indicates that the coding format of the received SSID is the same as the coding format of the SSID of the wireless router. The smart device may then access the wireless access point according to the SSID in the access information and the access password.

Figure 5:
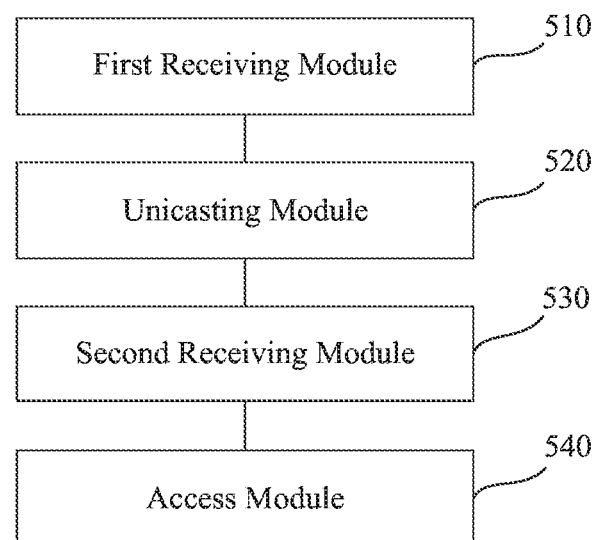
FIG. 5 is a block diagram of an apparatus for accessing a wireless access point, according to an exemplary embodiment.

FIG. 5 is a block diagram of an apparatus 500 for accessing a wireless access point, according to an exemplary embodiment. The apparatus 500 may be implemented as a whole or a part of the smart device 140 shown in FIG. 1 by hardware, software, or a combination thereof. Referring to FIG. 5, the apparatus 500 may include a first receiving module 510, a unicasting module 520, a second receiving module 530, and an access module 540.

The first receiving module 510 is configured to receive access information of the wireless access point broadcasted by a preset device, the access information including a BSSID and an access password of the wireless access point, and the preset device having successfully accessed the wireless access point.

The unicasting module 520 is configured to unicast device discovery information according to the BSSID received by the first receiving module 510, the device discovery information including the BSSID.

The second receiving module 530 is configured to receive feedback information sent by the wireless access point, the feedback information including an SSID of the wireless access point.

The access module 540 is configured to access the wireless access point according to the SSID in the feedback information received by the second receiving module 530 and the access password received by the first receiving module 510.

In the apparatus 500, by receiving the feedback information including an SSID of the wireless access point, the smart device may access the wireless access point according to the SSID in the feedback information and the access password previously received, thereby establishing a connection to the wireless router.

Figure 6:
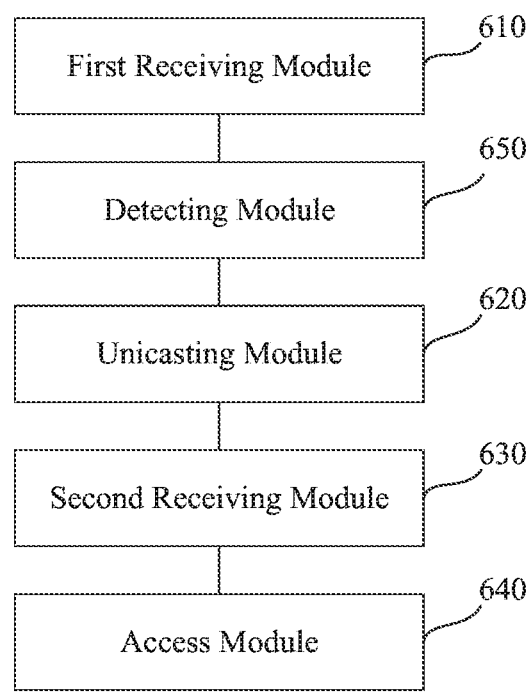
FIG. 6 is a block diagram of another apparatus for accessing a wireless access point, according to an exemplary embodiment.

FIG. 6 is a block diagram of another apparatus 600 for accessing a wireless access point, according to an exemplary embodiment. The apparatus 600 may be implemented as a whole or a part of the smart device 140 shown in FIG. 1 by hardware, software, or a combination thereof. Referring to FIG. 6, the apparatus 600 may include a first receiving module 610, a unicasting module 620, a second receiving module 630, an access module 640, and a detecting module 650.

The first receiving module 610 is configured to receive access information of the wireless access point broadcasted by a preset device, the access information including a BSSID and an access password of the wireless access point, and the preset device having successfully accessed the wireless access point. The access information further includes an SSID of the wireless access point broadcasted by the preset device.

The unicasting module 620 is configured to unicast device discovery information according to the BSSID received by the first receiving module 610, the device discovery information including the BSSID.

The second receiving module 630 is configured to receive feedback information sent by the wireless access point, the feedback information including an SSID of the wireless access point.

The access module 640 is configured to access the wireless access point according to the SSID in the feedback information received by the second receiving module 630 and the access password received by the first receiving module 610.

In some embodiments, the unicasting module 620 is further configured to unicast a probe request including the BSSID.

After the smart device unicasts the probe request, devices nearby the smart device, such as the wireless router corresponding to the BSSID may receive the probe request.

In some embodiments, the second receiving module 630 is further configured to receive a probe response sent by the wireless access point. The probe response may include an SSID of the wireless router, which may be recognized by the wireless router and have the same coding format with the SSID stored in the wireless router.

After receiving the probe request, the devices nearby the smart device may read an identification included in the probe request, and when the identification identifies the device itself, such as the wireless router, this device may feedback a probe response to the smart device. Thereby, when the wireless router receives the probe request and reads that the BSSID in the probe request is the same as the wireless router's BSSID, the wireless router may feedback the probe response to the smart device. Accordingly, the smart device may receive the probe response via the second receiving module 630.

The detecting module 650 is configured to, detect whether the SSID in the access information contains a preset character before unicasting the device discovery information by the unicasting module 620, the preset character being a character having a plurality of coding formats.

The unicasting module 620 is configured to, if the detecting module 650 detects that the preset character is included in the SSID, unicast the device discovery information according to the BSSID.

If the preset character is included in the SSID in the access information, it indicates that the coding format of the received SSID may be different from the coding format of the SSID of the wireless router, then the smart device may not access the wireless router according to the received SSID. The smart device may then unicast a probe request including the BSSID via the unicasting module 620.

If the preset character is not included in the SSID, it indicates that the coding format of the received SSID is the same as the coding format of the SSID of the wireless router. The smart device may then access the wireless router according to the SSID in the access information and the access password.

Figure 7:
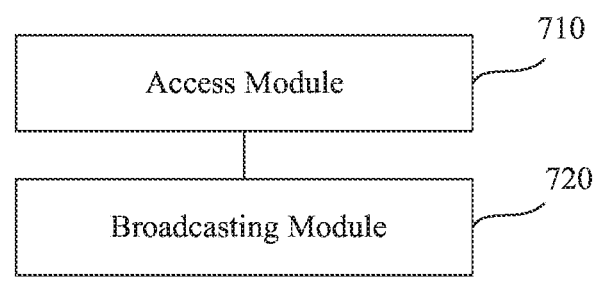
FIG. 7 is a block diagram of an apparatus for accessing a wireless access point, according to another exemplary embodiment.

FIG. 7 is a block diagram of an apparatus 700 for accessing a wireless access point, according to another exemplary embodiment. The apparatus 700 may be implemented as a whole or a part of the preset device 120 shown in FIG. 1 by hardware, software, or a combination thereof. Referring to FIG. 7, the apparatus 700 may include an access module 710 and a broadcasting module 720.

The access module 710 is configured to access a wireless access point.

The broadcasting module 720 is configured to broadcast access information of the wireless access point, the access information including a BSSID and an access password of the wireless access point, and the BSSID and the access password being configured for instructing a smart device to access the wireless access point.

Figure 8:
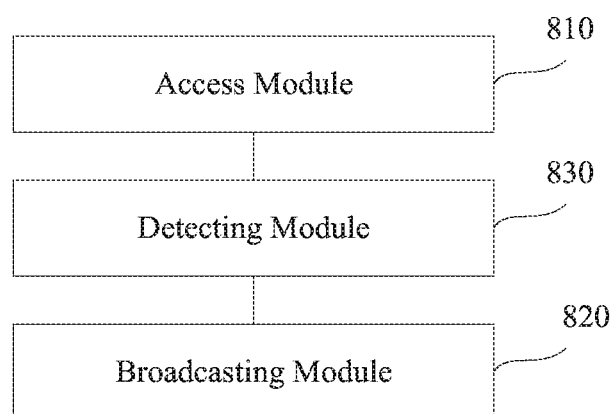
FIG. 8 is a block diagram of another apparatus for accessing a wireless access point, according to another exemplary embodiment.

FIG. 8 is a block diagram of another apparatus 800 for accessing a wireless access point, according to another exemplary embodiment. The apparatus 800 may be implemented as a whole or a part of the preset device 120 shown in FIG. 1 by hardware, software, or a combination thereof. Referring to FIG. 8, the apparatus 800 may include an access module 810, and a broadcasting module 820.

The access module 810 is configured to access a wireless access point.

For example, the wireless access point may be a wireless router, and the preset device may be a mobile phone.

The mobile phone may search for SSIDs of nearby wireless routers, display an interface including the identified SSIDs, receive a selection signal of selecting a certain SSID from the interface by a user, receive an access password of the SSID inputted by the user, and access the wireless router according to the SSID and the received access password.

The broadcasting module 820 is configured to broadcast access information of the wireless access point, the access information including a BSSID and an access password of the wireless access point, and the BSSID and the access password being configured for instructing a smart device to access the wireless access point.

In some embodiments, the apparatus 800 further includes a detecting module 830.

The detecting module 830 is configured to, before the broadcasting module 820 sends the access information of the wireless access point to the smart device, detect whether an SSID of the wireless access point includes a preset character, the preset character being a character having a plurality of coding formats.

The broadcasting module 820 is configured to, if the detecting module 830 detects that the preset character is included, broadcast the access information of the wireless access point.

If the SSID of the wireless router includes the preset character, it indicates that the coding format of the SSID in the mobile phone may be different from the coding format of the SSID of the wireless router. The mobile phone may then broadcast the access information including the BSSID of the wireless router and the access password via the broadcasting module 820. In some embodiments, the access information may further include an SSID of the wireless router.

If the detecting module 830 detects that no preset character is included, it indicates that the coding format of the SSID in the mobile phone is the same as the coding format of the SSID of the wireless router, the mobile phone may broadcast the SSID of the wireless router and the access password. After the mobile phone broadcasts the existing SSID and the access password, the smart device may successfully be connected to the wireless router according to the SSID and the access password.

Figure 9:
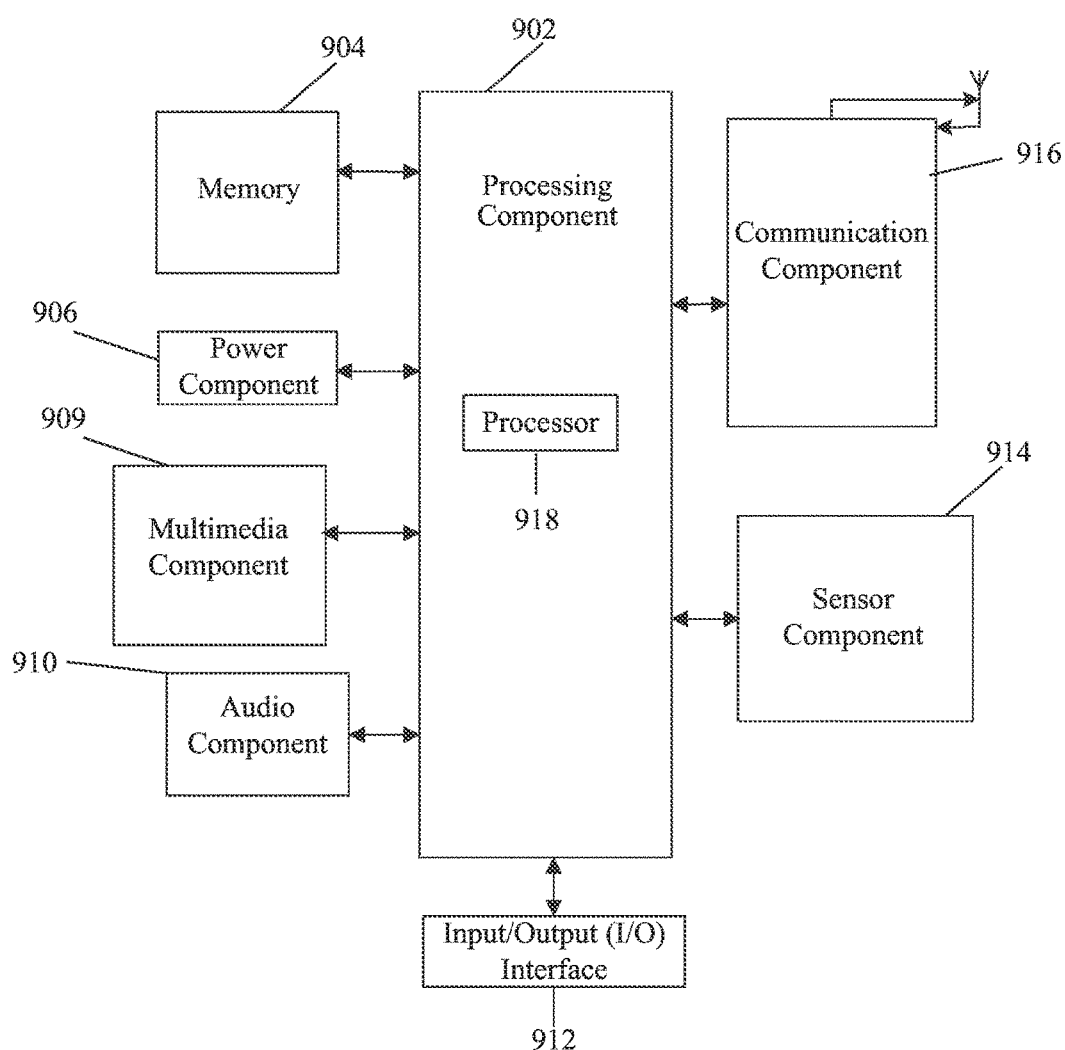
FIG. 9 is a block diagram of a device, according to an exemplary embodiment.

FIG. 9 is a block diagram of a device 900 for accessing a wireless access point, according to an exemplary embodiment. For example, the device 900 may be the preset device 120 or the smart device 140 shown in FIG. 1.

Referring to FIG. 9, the device 900 may include one or more of the following components: a processing component 902, a memory 904, a power component 906, a multimedia component 909, an audio component 910, an input/output (I/O) interface 912, a sensor component 914, and a communication component 916. The person skilled in the art should appreciate that the structure of the device 900 as shown in FIG. 9 does not intend to limit the device 900. The device 900 may include more or less components or combine some components or other components.

The processing component 902 typically controls overall operations of the device 900, such as the operations associated with display, data communications, camera operations, and recording operations. The processing component 902 may include one or more processors 918 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 909 and the processing component 902.

The memory 904 is configured to store various types of data to support the operation of the device 900. The processing component 902 performs various functions and data processing by operating programs and modules stored in the memory 904. Examples of such data include instructions for any applications or methods operated on the device 900, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 is configured to provide power to various components of the device 900. The power component 906 may include a power management system, one or more power sources, and/or any other components associated with the generation, management, and distribution of power in the device 900.

The multimedia component 909 includes a screen providing an output interface between the device 900 and the user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, swipes, and gestures performed on the touch panel. The touch sensors may not only sense a boundary of a touch or swipe action, but also sense a period of time and a pressure associated with the touch or swipe action.

The audio component 910 is configured to output and/or input audio signals. For example, the audio component 910 may include a microphone configured to receive an external audio signal when the device 900 is in an operation mode, such as a call mode, a recording mode, and/or a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, stereos, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an on/off status of the device 900, relative positioning of components, e.g., the display, of the device 900, a change in position of the device 900 or a component of the device 900, a presence or absence of user contact with the device 900, an orientation or an acceleration/deceleration of the device 900, and/or a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G, or 3G, or a combination thereof. In one exemplary embodiment, the communication component 916 receives a unicasting signal or unicasting information from an external unicasting management system via a unicasting channel. In another exemplary embodiment, the communication component 916 receives a broadcast signal or broadcast information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for accessing a wireless access point.

In exemplary embodiments, there is also provided a non-transitory computer-readable storage medium including instructions, such as included in the memory 904, executable by the processor 918 in the device 900, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for accessing a wireless access point, comprising:
    receiving, by a smart device, access information of the wireless access point broadcasted by a preset device, the access information including a Basic Service Set Identifier (BSSID) and an access password of the wireless access point, and the preset device having successfully accessed the wireless access point;
    unicasting, by the smart device, device discovery information according to the BSSID, the device discovery information including the BSSID;
    receiving, by the smart device, feedback information sent by the wireless access point, the feedback information including a Service Set Identifier (SSID) of the wireless access point; and
    accessing, by the smart device, the wireless access point according to the SSID in the feedback information and the access password,
    wherein the SSID of the wireless access point is a first SSID, and the access information broadcasted by the preset device further includes a second SSID, the method further comprising:
    before unicasting the device discovery information according to the BSSID, detecting whether the second SSID in the access information includes a preset character, the preset character having a plurality of coding formats; and
    when the preset character is included in the second SSID, performing the unicasting of the device discovery information according to the BSSID.

2. The method of claim 1, wherein the device discovery information comprises a probe request, the probe request including the BSSID.

3. The method of claim 2, wherein the feedback information sent by the wireless access point comprises a probe response sent by the wireless access point.

4. The method of claim 1, further comprising:
    when the preset character is not included in the second SSID, accessing the wireless access point according to the second SSID broadcasted by the preset device and the access password.

5. The method of claim 1, wherein the preset device is a mobile phone, and the wireless access point is a wireless router.

6. An apparatus for accessing a wireless access point, comprising:
    a processor; and
    a memory for storing instructions executable by the processor;
    wherein the processor is configured to execute the instructions to cause the apparatus to:
    receive access information of the wireless access point broadcasted by a preset device, the access information including a Basic Service Set Identifier (BSSID) and an access password of the wireless access point, and the preset device having successfully accessed the wireless access point;
    unicast device discovery information according to the BSSID, the device discovery information including the BSSID;
    receive feedback information sent by the wireless access point, the feedback information including a Service Set Identifier (SSID) of the wireless access point; and
    access the wireless access point according to the SSID in the feedback information and the access password,
    wherein the SSID of the wireless access point is a first SSID, and the access information broadcasted by the preset device further includes a second SSID, the processor further being configured to:
    before unicasting the device discovery information according to the BSSID, detect whether the second SSID in the access information includes a preset character, the preset character having a plurality of coding formats; and
    when the preset character is included in the second SSID, unicast the device discovery information according to the BSSID.

7. The apparatus of claim 6, wherein the device discovery information comprises a probe request, the probe request including the BSSID.

8. The apparatus of claim 7, wherein the feedback information sent by the wireless access point comprises a probe response sent by the wireless access point.

9. The apparatus of claim 6, wherein the processor is further configured to:
    when the preset character is not included in the second SSID, access the wireless access point according to the second SSID broadcasted by the preset device and the access password.

10. The apparatus of claim 6, wherein the preset device is a mobile phone, and the wireless access point is a wireless router.

* * * * *